United States Patent [19]

Rogan et al.

[11] 4,334,047
[45] Jun. 8, 1982

[54] POLYMERIZATION CATALYSTS

[75] Inventors: John B. Rogan, Glen Ellyn; Robert V. Morris, Naperville, both of Ill.

[73] Assignee: Standard Oil Company (Indiana), Chicago, Ill.

[21] Appl. No.: 856,763

[22] Filed: Dec. 2, 1977

Related U.S. Application Data

[63] Continuation-in-part of Ser. No. 700,582, Jun. 28, 1976, abandoned.

[51] Int. Cl.$^3$ .......................... C08F 4/64; C08F 10/06
[52] U.S. Cl. ............................... 526/138; 252/429 B; 526/141; 526/351
[58] Field of Search ................... 252/429 B; 526/138, 526/141

[56] References Cited

U.S. PATENT DOCUMENTS

| | | | |
|---|---|---|---|
| 3,219,648 | 11/1965 | Hill | 526/141 |
| 3,984,350 | 10/1976 | Karayannis et al. | 526/140 |
| 4,072,809 | 2/1978 | Rogan | 526/136 |

FOREIGN PATENT DOCUMENTS 998601  7/1965  United Kingdom ................ 526/141

OTHER PUBLICATIONS

Boor, Journal of Polymer Science, Pt. A, vol. 3, (1965), pp. 995–1012.

*Primary Examiner*—Edward J. Smith
*Attorney, Agent, or Firm*—Stephen L. Hensley; William T. McClain; William H. Magidson

[57] ABSTRACT

Improved catalysts are disclosed for producing highly crystalline alpha-olefin polymers and highly crystalline copolymers of an alpha-olefin with ethylene or other olefins. Such catalysts can reduce the amount of coproduced amorphous polymer formed without substantial adverse effect on polymerization yield. These novel catalysts involve improving an alkylaluminum component-titanium chloride catalyst by using such catalyst in combination with effective amounts of sulfur dioxide and certain amines. Such catalyst compositions are useful in slurry polymerization, bulk polymerization and, particularly, vapor phase polymerization.

20 Claims, No Drawings

POLYMERIZATION CATALYSTS

This is a continuation-in-part of application Ser. No. 700,582, filed June 28, 1976, now abandoned.

SUMMARY OF THE INVENTION

This invention relates to improved catalysts for the polymerization of an alpha-olefin or its mixtures with ethylene or other olefins which produce a larger fraction of the commercially desirable normally solid, highly crystalline polymer, and more specifically, to improved catalysts for slurry, bulk, and particularly, vapor phase polymerization of propylene, its mixtures with ethylene or other $C_4$ to $C_8$ olefins which produce a larger fraction of normally solid, highly crystalline, polymeric products wherein coproduced hexane soluble polymer is substantially reduced and polymerization yields are not substantially decreased.

In accordance with the instant invention, propylene, its mixtures with ethylene or other $C_4$ to $C_8$ olefins are polymerized to normally solid, highly crystalline polymers in a slurry, bulk, or particularly, vapor phase polymerization at a monomer pressure of about atmospheric or above and a moderate polymerization temperature with a catalyst composition comprising: (a) an alkylaluminum component; (b) a reduced chloride of titanium; (c) sulfur dioxide; and (d) 2,4,6-collidine, bis-(2-ethoxyethyl)amine or a mixture thereof.

The polymeric products produced using the above-described catalyst systems in slurry polymerization can contain amounts of low molecular weight, and particularly, amorphous components, as measured by extraction using n-hexane, as low as about one to two percent of the total polymer yield without seriously sacrificing polymer yield; certain properties of polyalphaolefins made by vapor phase polymerization can be particularly improved.

BACKGROUND OF THE INVENTION

Polymers of alpha-olefins prepared in the presence of ionic catalyst systems, for example, polypropylene prepared using a catalyst comprised of diethylaluminum chloride and a titanium trichloride, contain greater or lesser amounts of low molecular weight, and particularly, amorphous components which, when taken alone, are alkane soluble materials. The presence of these alkane-soluble materials in the polymers leads to difficulties during the fabrication of products therefrom and to inferior physical properties in the finished items, and hence are almost always removed in commercial processes for the production of polypropylene. Also, production of these components leads to economic disabilities for the process as they have little usefulness and extra process steps are generally required to remove them from the commercial product and, in the slurry process, from the polymerization medium prior to recycle of the medium.

In the past a number of materials and combinations thereof have been reported in the patent literature as useful modifiers for transition metal compound-alkylaluminum component alpha-olefin catalysts to reduce the alkane-soluble fraction produced during the polymerization process. Among these modifiers are amines, amine oxides, ethers, organophosphites, combinations of organotin sulfides and amines, amine oxides or organophosphites, and combinations of hydrogen sulfide with amines, amine oxides, organophosphites or ethers. The combinations containing organotin sulfides or hydrogen sulfide have been described as showing a greater effect on solubles reduction while exerting little adverse effect on yield than either component of the combination alone. However, such mixtures have some disadvantages which include the cost of organotin sulfides, the presence of traces of tin in the polymer, the formation of line clogging precipitates when hydrogen sulfide and certain aluminum alkyl compounds are combined, and the toxicity of hydrogen sulfide.

Since it is generally true that slowing an alpha-olefin polymerization down produces more of the crystalline polymer, and that modifiers when their concentrations become high enough decrease the polymerization rate, the object of the work leading to the invention described herein is to obtain maximum solubles reduction with the smallest adverse effect upon yield while maintaining the commercially important properties of the product polymer. Even small changes in solubles and yield can have large economic effects when the amount of polymer produced per year is extremely large.

Further, in vapor phase or bulk polymerization it is convenient to add the modifiers and aluminum alkyl component dissolved in inert medium into the reactor in a separate stream from the one containing the titanium compound. If the modifiers and alkylaluminum compound form a precipitate, line clogging in the stream can be a problem and it has been observed that the two catalysts streams are combined improperly in the reactor resulting in deteriorated product properties.

Now it has been found that by using sulfur dioxide and certain amines together as a modifier, catalyst compositions are formed which when used for propylene polymerization result in a substantial reduction of the alkane soluble fraction without serious decrease in polymer yield. Such compositions can show better solubles reduction than shown by either additive when used alone. In addition, the compositions taught herein can result in improvements in certain polymer properties when used in the convenient split addition mode in vapor state and bulk polymerization process. In addition, in slurry polymerization processes wherein a slurry of the polymeric product is commonly washed with an aqueous medium, the use of compositions containing bis-(2-ethoxyethyl) amine as disclosed herein is particularly advantageous in that bis-(2-ethoxyethyl) amine is highly soluble in water and therefore aqueous washing of the polymer slurry will serve to substantially remove this amine from the slurry thereby reducing levels of the amine in not only the final polymeric product but also, in the polymerization medium such that recycle of the same is facilitated.

The catalyst systems disclosed herein can be used for alpha-olefin polymerization wherein supported or other types of high activity titanium compound catalyst components are employed to make highly crystalline product.

STATEMENT OF THE INVENTION

As shown in Table I below, the n-hexane soluble fraction can be reduced in a polypropylene slurry polymerization when a diethylaluminum chloride-titanium trichloride catalyst is admixed with sulfur dioxide.

TABLE I

Slurry Polymerization Comparison of Crystalline Polypropylene Yield and Solubles for Different Levels of Sulfur Dioxide

| Mol Ratio *Et$_2$AlCl/TiCl$_3$/SO$_2$ | Crystalline Yield (grams polymer/gram TiCl$_3$) | N-Hexane Solubles (percent) |
|---|---|---|
| 1.5/1/0 | 125.5 | 4.6 |
|  | 130.0 | 3.8 |
| 2.5/1/0 | 121.0 | 4.9 |
|  | 128.5 | 3.8 |
| 1.5/1/0.01 | 114.0** | 3.9 |
| 2/1/0.01 | 133.0 | 4.3 |
| 2/1/0.02 | 134.0 | 3.6 |
| 2/1/0.03 | 124.5 | 3.1 |
| 2/1/0.04 | 127.0 | 2.9 |

*Et represents the ethyl radical.
**Low as a result of an unknown variation in polymerization conditions.

The results in Table I indicate that admixing the catalyst with a small amount of sulfur dioxide can result in lower solubles without serious effect on yield.

TABLE II

Slurry Polymerization Comparison of Crystalline Polypropylene Yield and Solubles for Different Levels of bis-(2-ethoxyethyl)amine

| Mol Ratio Et$_2$AlCl/TiCl$_3$/Beea* | Crystalline Yield (grams polymer/gram TiCl$_3$) | n-Hexane Solubles (percent) |
|---|---|---|
| 1.5/1/0.00125 | 123.0 | 4.7 |
| 1.5/1/0.0025 | 120.0 | 5.6 |
| 1.5/1/0.005 | 119.0 | 4.8 |

*Beea is bis-(2-ethoxyethyl)amine.

The data set forth in Table II show that small amounts of bis-(2-ethoxyethyl)amine have little effect on crystalline yield and solubles.

TABLE III

Slurry Polymerization Comparison of Crystalline Polypropylene Yield and Solubles for Different Levels of bis-(2-ethoxyethyl)amine and Sulfur Dioxide

| Mol Ratio Et$_2$AlCl/TiCl$_3$/SO$_2$/Beea | Crystalline Yield (grams polymer/ gram TiCl$_3$) | n-Hexane Solubles (percent) |
|---|---|---|
| 2.0/1/0.02/0.00125 | 120.5 | 3.4 |
| /0.0025 | 124.0 | 3.2 |
| /0.005 | 116.0 | 2.7 |

The data in Table III shows the beneficial effect upon propylene polymerization that can be obtained by admixing sulfur dioxide and bis-(2-ethoxyethyl)amine with the catalyst of Tables I and II.

The alkylaluminum component for the herein described invention is a lower alkyl, alkylaluminum derivative wherein the alkyl radical contains one to about six carbon atoms, and preferably is a trialkylaluminum, a mixture thereof with an alkylaluminum dichloride or dibromide or a dialkylaluminum chloride or bromide, or a dialkylaluminum chloride or bromide.

More preferably, this first material is a trialkylaluminum, a mixture thereof with either a dialkylaluminum chloride or an alkylaluminum dichloride, or a dialkylaluminum chloride. Most preferably, a dialkylaluminum chloride is used. The amount of this first component to be used is based upon the reactor size, the amount of the titanium component used and the amount of olefin to be polymerized as is known to one skilled in the art of polymerization.

The titanium compounds preferred herein are reduced titanium chlorides and, more preferably, titanium trichlorides or compositions based essentially thereon such as aluminum activated titanium trichloride, a titanium trichloride activated in other manners such as chemical activation with an electron donor incorporated into the titanium trichloride or a titanium chloride supported on a substrate. Mixtures can also be used. The amount of titanium compound employed is based upon the amount and composition of the particular polymer to be made and the polymerization conditions used and is known to one skilled in this art.

Sulfur dioxide and the amines disclosed herein are used in amounts which are effective to reduce the fraction of alkane soluble components produced during polymerization without serious decreases in total polymer yield. Sulfur dioxide concentrations should not be so high as to destroy catalyst activities. Generally, an effective amount of sulfur dioxide ranges up to about 20 mol % based upon the amount of titanium compound employed. Preferably, up to about 15 mol % sulfur dioxide is employed. Most preferably, from about 1 to 10 mol % sulfur dioxide, based upon the titanium compound concentration, is employed.

As set forth above, the amines disclosed herein are used in amounts which are effective to reduce levels of alkane-solubles without seriously decreasing polymer yields. In the case of 2,4,6-collidine, an effective amount ranges from about 0.2 to 10 mols per mol of sulfur dioxide employed. Preferably, from about 0.33 to 6 mols 2,4,6-collidine are employed for each mol of sulfur dioxide. Most preferably, 2,4,6-collidine concentrations range from about 0.5 to 2 mols per mol of sulfur dioxide. An effective amount of bis-(2-ethoxyethyl)amine ranges from about 0.02 to 1 mol per mol of sulfur dioxide, preferably from about 0.03 to 0.5 mol per mol of sulfur dioxide, and most preferably from about 0.06 to 0.5 mol per mol of sulfur dioxide.

In slurry polymerization, the preferred mode of addition of catalyst and modifier components is carried out at ambient temperature and comprises admixing the amine and the alkylaluminum component, then admixing the result with the titanium trichloride, and finally introducing the sulfur dioxide. However, any manner of making up the catalyst system of alkylaluminum component, a titanium chloride, sulfur dioxide and amine can be used. In bulk and vapor phase polymerization, the sulfur dioxide, alkylaluminum component, and amine are dissolved in a small amount of an inert medium, such as an alkane, and added as a separate stream to the reactor. The titanium compound is added as a second stream, generally as a slurry in an inert medium such as an alkane. Other methods of catalyst and modifier addition can be employed.

As is obvious to one skilled in the art, precautions should be taken to avoid oxygen and moisture contamination of the catalyst during its preparation and its transfer. Catalyst preparation can be carried out under an inert atmosphere using such gases as argon, nitrogen, helium, etc. Normally, during use no precautions need be taken as a positive pressure of monomer gas exists within the reactor.

The temperature at which the catalysts according to this invention are used is not critical. However, at temperatures below about 0° C. the rate of polymerization slows down and reactor residence times become unreasonably long, whereas at temperatures exceeding about 120° C., polymerization rates become too high and an increase in solubles production is found. Preferably, the temperature range in which the catalyst can be used is about 2° C. to about 95° C. Most preferably, the temperature range is from about 50° C. to about 80° C.

The process of the invention can be carried out at a monomer pressure of about atmospheric or above. Pressures of about 20 p.s.i.g. to about 600 p.s.i.g. or higher are preferred depending upon which polymerization technique is used.

The organic liquid employed as the polymerization medium in the slurry technique can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as toluene or xylene, or a halogenated aromatic compound such as chlorobenzene, chloronaphthalene or ortho-dichlorobenzene. The nature of the polymerization medium is subject to considerable variation, although the material employed should be liquid under the conditions of reaction and relatively inert. Saturated, aliphatic hydrocarbon liquids like hexane are preferably employed. Other solvents which can be used include ethylbenzene, isopropylbenzene, ethyltoluene, n-propylbenzene, diethylbenzenes, mono- and dialkylnaphthalenes, n-pentane, n-octane, isooctane and methylcyclohexane. The preparative media employed in practicing this invention can be advantageously purified prior to use in the polymerization reaction by contacting the material, for example, in distillation procedure or otherwise, with alkylaluminum compounds to remove undesirable trace impurities. Also, prior to polymerization the catalyst system can be contacted advantageously with a polymerizable alpha olefin such as propylene.

The polymerization time is not critical and will usually be of the order of from thirty minutes to several hours in batch processes. Contact times of from one to four hours are commonly employed in autoclave-type reactions. When continuous slurry process is employed, the contact times in the polymerization zone can be regulated as desired, and it is not necessary to employ reaction or contact times much beyond one-half to several hours since a cyclic system can be employed by separation of the polymer and return of the polymerization medium, if used, and excess monomer to the charging zone wherein the catalyst can be replenished and additional monomer introduced.

The invention is of particular importance in the preparation of highly-crystalline $C_3$ to $C_8$ alpha-olefins, particularly polypropylene. It can also be used for polymerizing a mixture of such an alpha-olefin and, preferably, up to about fifteen mol percent of ethylene or another $C_3$ to $C_8$ olefin such as butene-1 to form highly crystalline copolymers. Such copolymers include without limitation pure block, terminal block and multisegment types of copolymers.

The process and catalyst combination of this invention are normally used with an additive to control molecular weight such as dialkyl zinc compound or hydrogen, preferably hydrogen. Solid polymers having molecular weights greater than about 20,000 and less than about 5,000,000 result thereby. The amount of hydrogen to be used depends upon the melt flow rate and molecular weight distribution to be obtained and the condition of its use are well known to those skilled in the art.

While the invention herein is described in connection with the specific Examples below, it is to be understood that those are for illustrative purposes only. Many alternatives, modifications and variations will be apparent to those skilled in the art in the light of the below Examples and such alternatives, modifications and variations fall within the scope and spirit of the appended claims.

GENERAL EXPERIMENTAL PROCEDURE

The polymerizations described in the Examples I and II were carried out in 190 milliliters of hexane in pressure bottles at 70° C. for two hours using 40 p.s.i.g. of propylene and 0.20 grams of aluminum activated titanium trichloride ($AATiCl_3$) added as a twenty-five percent slurry in mineral oil. Mol ratios are moles per mole of the titanium trichloride used.

The catalyst was made up at room temperature for Examples I and II by admixing the requisite amount of amine and the alkylaluminum compound, then admixing the result with titanium trichloride and finally incorporating the sulfur dioxide.

In Examples I and II, the contents of the pressure bottle were killed with methanol after polymerization and the solid filtered off, dried and weighed to give the Crystalline Yield. The supernatant liquid was evaporated to dryness and the residue weight, multiplied by 100 and divided by the Crystalline Yield plus the residue weight, was calculated to give the percent of n-Hexane Solubles.

The Crystalline Yield and n-Hexane Solubles for Examples I and II have been corrected for variation in different batches of catalyst components, propylene, etc. by running a standard polymerization each time an experimental run was made and correcting the experimental run for any deviation of the standard's Crystalline Yield or n-Hexane Solubles. In each Example each Crystalline Yield and n-Hexane Solubles value is the average of two polymerization runs.

EXAMPLE I

| Mol Ratio $Et_2AlCl/SO_2/Coll$* | Crystalline Yield (grams polymer/gram $TiCl_3$) | n-Hexane Solubles (percent) |
|---|---|---|
| 1.5/0.01/0.02 | 111.5 | 2.8 |
| /0.04 | 108.5 | 2.7 |
| /0.06 | 115.5 | 2.2 |
| 0.02/0.02 | 112.5 | 2.2 |
| /0.04 | 121.5 | 1.8 |
| /0.06 | 115.0 | 2.1 |
| 0.04/0.02 | 107.0 | 2.1 |
| /0.04 | 103.0 | 1.8 |
| /0.06 | 111.5 | 2.6 |
| 0.06/0.02 | 98.0 | 2.2 |
| /0.04 | 103.5 | 1.9 |
| /0.06 | 103.0 | 1.8 |
| 2/0.01/0.02 | 120.5 | 2.4 |
| /0.04 | 117.5 | 2.5 |
| /0.06 | 125.0 | 2.4 |
| 0.02/0.02 | 116.5 | 2.6 |
| /0.04 | 112.5 | 2.3 |
| /0.06 | 111.0 | 1.9 |
| 0.04/0.02 | 109.0 | 2.0 |
| /0.04 | 110.5 | 2.0 |
| /0.06 | 118.0 | 2.1 |
| 0.06/0.02 | 100.5 | 1.9 |
| /0.04 | 107.5 | 1.9 |
| /0.06 | 112.0 | 1.8 |

*Coll is 2,4,6-collidine

EXAMPLE II

| Mol Ratio $Et_2AlCl/SO_2/Beea$* | Crystalline Yield (grams polymer/gram $TiCl_3$) | n-Hexane Solubles (percent) |
|---|---|---|
| 1.5/0/0.00125 | 123.0 | 4.7 |

EXAMPLE II-continued

| Mol Ratio Et$_2$AlCl/SO$_2$/Beea* | Crystalline Yield (grams polymer/gram TiCl$_3$) | n-Hexane Solubles (percent) |
|---|---|---|
| 0.0025 | 120.0 | 5.6 |
| 0.005 | 119.0 | 4.8 |
| 0.01/0.00125 | 123.5 | 4.4 |
| 0.0025 | 119.5 | 3.7 |
| 0.005 | 114.0 | 3.1 |
| 0.02/0.00125 | 117.0 | 3.2 |
| 0.0025 | 115.0 | 2.8 |
| 0.005 | 105.0 | 2.5 |
| 0.04/0.00125 | 104.5 | 2.2 |
| 0.0025 | 115.0 | 2.4 |
| 0.005 | 104.5 | 2.4 |
| 2/0/0.00125 | 121.0 | 5.5 |
| 0.0025 | 112.0 | 3.9 |
| 0.005 | 96.5 | 3.2 |
| 0.01/0.00125 | 124.0 | 4.6 |
| 0.0025 | 121.0 | 3.5 |
| 0.005 | 117.0 | 3.4 |
| 0.02/0.00125 | 120.5 | 3.4 |
| 0.0025 | 124.0 | 3.2 |
| 0.005 | 116.0 | 2.7 |
| 0.04/0.00125 | 108.0 | 2.6 |
| 0.0025 | 107.5 | 2.3 |
| 0.005 | 112.5 | 2.6 |

*Beea is bis-(2-ethoxyethyl)amine.

EXAMPLE III

The results set forth below were obtained using a bulk phase propylene polymerization process operated at 160° F. for 2 hours using a two liter reactor. The Et$_2$AlCl, TiCl$_3$, SO$_2$ and 2,4,6-collidine components were added as a concentrated slurry in mineral oil in the ratios shown below in the Table.

TABLE

| Mol Ratio Et$_2$AlCl/SO$_2$Coll | Total Yield** (grams polymer/ gram TiCl$_3$) | Extractibles* (weight percent) |
|---|---|---|
| 3/0.015/0.03 | 7,080 | 4.4 |
|  | 5,860 | 3.7 |
| 3/0.03/0.06 | 6,640 | 3.9 |
|  | 7,220 | 3.1 |
|  | 7,000 | 2.6 |
| 3/0.03/0.06 | 6,680 | 3.5 |
|  | 6,600 | 2.3 |
|  | 7,200 | 2.6 |
| 3/0.03/0.06 | 7,000 | 3.2 |
|  | 7,120 | 2.7 |
| 3.5/0.06/0.12 | 6,700 | 2.9 |
| 4.5/0.08/0.16 | 6,470 | 2.5 |
|  | 6,040 | 2.5 |

*Soluble polymer obtained by extracting a standard weight of polypropylene product with hexane in a Soxhlet extractor for a standard length of time.
**Chemically activated titanium catalyst component used.

EXAMPLE IV

The results set forth below were obtained by polymerizing propylene in a horizontal, stirred, quench-cooled reactor equipped with melt finishing. The TiCl$_3$ was added as a slurry in hexane and the Et$_2$AlCl, SO$_2$, 2,4,6-collidine mixture was added as a concentrated solution in hexane. The mol ratio, Et$_2$AlCl/TiCl$_3$/SO$_2$/2,4,6-collidine, employed was 4/1/0.08/0.16.

TABLE

| Melt Flow Rate* (grams/ten minutes) | Extractibles (weight percent) |
|---|---|
| 1.3 | 1.7 |
| 0.87 | 1.6 |
| 4.6 | 2.5 |
| 10.4 | 2.2 |
| 1.6 | 1.9 |

*ASTM D-1238 (Condition L).

I claim:

1. An alpha-olefin polymerization catalyst composition comprising:
   (a) an alkylaluminum component selected from the group consisting of a trialkylaluminum, a dialkylaluminum chloride or bromide, a mixture of a trialkylaluminum and a dialkylaluminum chloride or bromide, and a mixture of a trialkylaluminum and an alkylaluminum dichloride or dibromide; wherein each alkyl radical contains from 1 to about 6 carbon atoms;
   (b) a titanium trichloride;
   (c) an effective amount, up to about 20 mol % based upon the amount of the titanium trichloride employed, of sulfur dioxide; and
   (d) an effective amount, ranging from about 0.2 to 10 mols per mol of sulfur dioxide employed, of 2,4,6-collidine;
   said effective amounts being effective to reduce the fraction of alkane-soluble polymer produced during polymerization of said alpha-olefin without serious decreases in total polymer yield.

2. The composition of claim 1 wherein the alkylaluminum component is a dialkylaluminum chloride and the titanium trichloride is an activated titanium trichloride.

3. The composition of claim 2 wherein the effective amount of sulfur dioxide ranges from about 1 to 6 mol % based upon the titanium trichloride concentration and the effective amount of 2,4,6-collidine ranges from about 0.33 to 6 mols per mol of sulfur dioxide.

4. An alpha-olefin polymerization catalyst composition comprising:
   (a) an alkylaluminum component selected from the group consisting of a trialkylaluminum, a dialkylaluminum chloride or bromide, a mixture of a trialkylaluminum and a dialkylaluminum chloride or bromide, and a mixture of a trialkylaluminum and an alkylaluminum dichloride or dibromide, wherein each alkyl radical contains from 1 to about 6 carbon atoms;
   (b) a titanium trichloride;
   (c) an effective amount, up to about 20 mol % based upon the amount of the titanium trichloride employed, of sulfur dioxide; and
   (d) an effective amount, ranging from about 0.02 to 1 mol per mol of sulfur dioxide employed, of bis-(2-ethoxyethyl)amine;
   said effective amounts being effective to reduce the fraction of alkane-soluble polymer produced during polymerization of said alpha-olefin without serious decreases in total polymer yield.

5. The composition of claim 4 wherein the alkylaluminum component is a dialkylaluminum chloride and the titanium trichloride is an activated titanium trichloride.

6. The composition of claim 5 wherein the effective amount of sulfur dioxide ranges from about 1 to 6 mol % based upon the titanium trichloride concentration and the effective amount of bis-(2-ethoxyethyl) amine ranges from about 0.03 to 0.5 mol per mol of sulfur dioxide.

7. A process for polymerizing propylene or a mixture thereof with ethylene or another C₄ to C₈ olefin to form a highly crystalline polymeric material comprising contacting, in a polymerization reactor under polymerizing conditions, said propylene or said mixture with a catalyst comprising:
(a) an alkylaluminum component selected from the group consisting of a trialkylaluminum, a dialkylaluminum chloride or bromide, a mixture of a trialkylaluminum and a dialkylaluminum chloride or bromide, and a mixture of a trialkylaluminum and an alkylaluminum dichloride or dibromide; wherein each alkyl radical contains from 1 to about 6 carbon atoms;
(b) a titanium trichloride;
(c) an effective amount, up to about 20 mol % based upon the amount of the titanium trichloride employed, of sulfur dioxide; and
(d) an effective amount, ranging from about 0.2 to 10 mols per mol of sulfur dioxide employed, of 2,4,6-collidine;
said effective amounts being effective to reduce the fraction of alkane-soluble polymer produced during said polymerization without serious decreases in total polymer yield.

8. The process according to claim 7 wherein the alkylaluminum component is a dialkylaluminum chloride and the titanium trichloride is an activated titanium trichloride.

9. The process according to claim 8 further comprising adding to the polymerization reactor separate streams of (1) a solution of said alkylaluminum component, said sulfur dioxide, and said 2,4,6-collidine in an inert medium, and (2) said titanium trichloride.

10. The process according to claim 9 wherein the reactor is a bulk polymerization reactor.

11. The process according to claim 9 wherein the reactor is a vapor phase polymerization reactor.

12. The process according to claim 11 wherein the reactor is a stirred, horizontal, quench-cooled reactor.

13. The process according to claim 12 wherein the effective amount of sulfur dioxide ranges from about 1 to 6 mol % based upon the titanium trichloride concentration and the effective amount of 2,4,6-collidine ranges from about 0.33 to 6 mols per mol of sulfur dioxide.

14. A process for polymerizing propylene or a mixture thereof with ethylene or another C₄ to C₈ olefin to form a highly crystalline polymeric material comprising contacting, in a polymerization reactor under polymerizing conditions, said propylene or said mixture with a catalyst comprising:
(a) an alkylaluminum component selected from the group consisting of a trialkylaluminum, a dialkylaluminum chloride or bromide, a mixture of trialkylaluminum and a dialkylaluminum chloride or bromide, and a mixture of a trialkylaluminum and an alkylaluminum dichloride or dibromide, wherein each alkyl radical contains from 1 to about 6 carbon atoms;
(b) a titanium trichloride;
(c) an effective amount, up to about 20 mol % based upon the amount of the titanium trichloride employed, of sulfur dioxide; and
(d) an effective amount, ranging from about 0.02 to 1 mol per mol of sulfur dioxide employed, of bis-(2-ethoxyethyl)amine;
said effective amounts being effective to reduce the fraction of alkane-soluble polymer produced during said polymerization without serious decreases in total polymer yield.

15. The process according to claim 14 wherein the alkylaluminum component is a dialkylaluminum chloride and the titanium trichloride is an activated titanium trichloride.

16. The process according to claim 15 further comprising adding to the polymerization reactor separate streams of (1) a solution of said alkylaluminum component, said sulfur dioxide, and said bis-(2-ethoxyethyl)amine in an inert medium, and (2) said titanium trichloride.

17. The process according to claim 16 wherein the reactor is a bulk polymerization reactor.

18. The process according to claim 16 wherein the reactor is a vapor phase polymerization reactor.

19. The process according to claim 18 wherein the reactor is a stirred, horizontal, quench-cooled reactor.

20. The process according to claim 19 wherein the effective amount of sulfur dioxide ranges from about 1 to 6 mol % based upon the titanium trichloride concentration and the effective amount of bis-(2-ethoxyethyl)amine ranges from about 0.03 to 0.5 mol per mol of sulfur dioxide.

* * * * *